Figure 1:
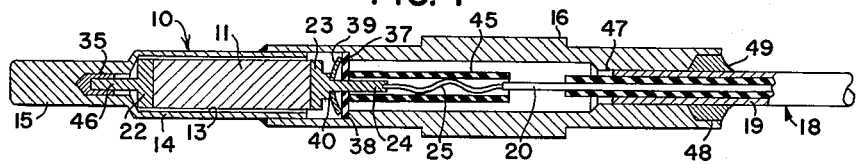

Dec. 12, 1961  R. W. FRITTS ET AL  3,013,097
SHOCK-RESISTANT MOUNTING MEANS FOR
FRANGIBLE ELECTRICAL CONDUCTORS
Filed Dec. 8, 1958

INVENTORS
ROBERT W. FRITTS
SEBASTIAN KARRER
BY
Carpenter Abbott Coulter & Kinney
ATTORNEYS United States Patent Office 3,013,097
Patented Dec. 12, 1961

3,013,097
SHOCK-RESISTANT MOUNTING MEANS FOR FRANGIBLE ELECTRICAL CONDUCTORS
Robert W. Fritts, Arden Hills, Minn., and Sebastian Karrer, Port Republic, Md., assignors to Minnesota Mining and Manufacturing Company, St. Paul, Minn., a corporation of Delaware
Filed Dec. 8, 1958, Ser. No. 778,812
10 Claims. (Cl. 136—4)

This application is a continuation-in-part of our copending application Serial No. 500,192, filed April 8, 1955, now Patent No. 2,892,879, and relates to improvements in electrical devices utilizing electrically conductive elements of frangible material, and more particularly to electrical devices embodying improved shock-resistant mounting means for such elements.

In the development of improved electrical devices, it has been found desirable to utilize components of electrically conductive material which is of a frangible nature. For example, semi-metallic alloys or compositions have been found to be particularly well adapted for use in thermoelectric devices for conversion or transfer of heat and electrical energy. Thermoelectric generators are illustrative of one such use of semi-metallic components. Utilization of semi-metallic alloys as electrical conductors presents problems not ordinarily encountered in the use, for example, of metallic electrical conductor elements, said problems arising from the characteristic physical and chemical differences between metallic elements and semi-metallic elements. For example, electrical conductors utilized as thermocouple elements are of necessity subjected to high temperatures and to large temperature changes, and treatment of semi-metallic electrical conductors utilized as thermocouple elements in the same manner as metallic elements would quickly destroy the semi-metallic elements, since at elevated temperatures semi-metallic elements oxidize rapidly and suffer undesirable changes in their electrical properties. Moreover, the mechanical or physical strength of semi-metallic elements is such that they are able to withstand only small tensile or shearing stresses, although mild compressive loads can be supported indefinitely.

In the use of semi-metallic materials in thermocouples, for example, the problem presented by the low physical strength of the semi-metallic element is further complicated by the fact that for maximum thermal or electrical efficiency said elements are formed with a length greater than the cross-sectional dimension thereof, for example in elongated cylindrical ingots. When an element of the aforementioned character is held at one or both ends, subjecting said element to acceleration or shock acting transversely to the longitudinal axis thereof produces relatively severe tensile stresses within the element tending to produce fracture thereof. To prevent such fracture, the net stresses, particularly tensile stresses, to which a semi-metallic element is subjected must not exceed the physical strength of said element. To accomplish this, the mounting for a semi-metallic element must not only protect said element against stresses which might arise therein as a result of the aforementioned transverse acceleration or shock, but it must also be so constructed that on thermal expansion any mismatch between the semi-metallic element and the surrounding parts tending to stress said element, tends to exert a compressive stress on said element rather than to exert a tensile stress thereon.

It is therefore among the objects of the present invention to provide an improved electrical device, for example a thermoelectric generator, embodying shock-resistant mounting means for an electrically conductive element of frangible, for example semi-metallic, material.

Another object is to provide an electrical device of the aforementioned character including a frangible conductor element wherein:

(1) The element is provided with an hermetically sealed enclosure affording disposition of said element in an inert atmosphere preventing, for the lifetime of the device, exposure of said element to oxygen or other deleterious gases.

(2) The element is supported within the enclosure in a manner to allow displacement of at least a part of said element for dissipation of the kinetic energy change for the element during transverse acceleration or shock without permitting impact of the element against the enclosure; and/or the element is placed under compression to reduce the net tensile stresses exerted thereon during transverse acceleration wherefore increased bending displacement of said element is permitted within the physical limits, and more particularly the tensile strength thereof.

(3) The thermal expansion differential between the element and its mounting is such that any residual stresses resulting from a thermal expansion differential between the two are compressive in nature with respect to the element and fall within the compressive strength of said element.

(4) The electrical connections for the element are of a nature to afford continuity of the electrical circuit during displacement due to mechanical shock and/or thermal expansion and contraction.

(5) The electrical connections for the element are of such a character as to be chemically stable with respect to said element.

(6) Efficient heat transfer through the assembly is provided by exposure of the thermal junctions of the element within the enclosure permitting radiative and/or conductive heat transfer to and from said junctions through said enclosure, thereby affording maximum conversion efficiency.

Figure 2:
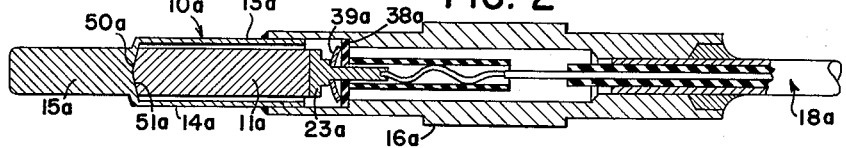
Figure 3:
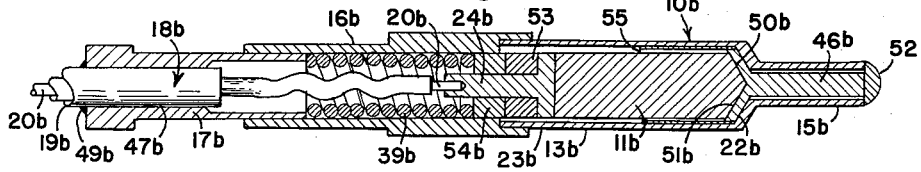
Figure 4:
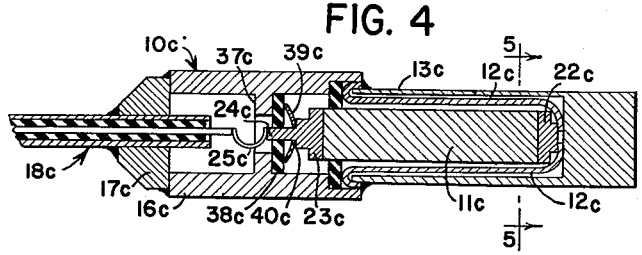
Figure 5:
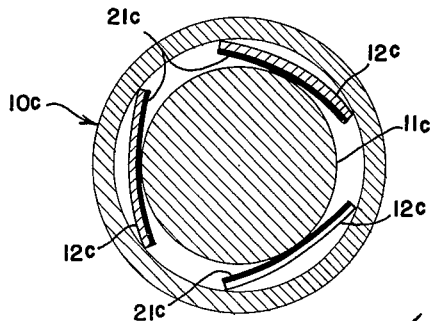

Other objects and advantages of the invention will become apparent as the description proceeds, reference being had to the drawings accompanying and forming a part of this specification and illustrating various embodiments of the inventive concept. The illustrated embodiments of electrical devices utilizing frangible electrically conductive elements each take the form of a thermocouple having a semi-metallic thermoelectric element. In the drawing:

FIGURES 1, 2, 3 and 4 are fragmentary longitudinal sectional views illustrating three forms of thermocouples constructed in accordance with the teachings of the present invention; and FIGURE 5 is a transverse sectional view taken along the line V—V of FIGURE 4.

Referring now to FIGURE 1 of the drawing, the electrical device selected for illustration therein comprises a thermoelectric generator 10 including a pair of thermocouple element means 11 and 13, the latter taking the form of an elongated cup-shaped sheath member, preferably of stainless steel. The sheath member 13 has a tubular sleeve portion 14 and an elongated tip portion 15 which is bored as at 35 and may serve as heat probe means for the assembly. The opposite end of the sheath 13 is coaxially received in a counterbore formed in one end of an extension tube or sheath member 16 of brass or other suitable material which forms with member 13 a sheath for the thermoelement 11 and associated parts. The end of the extension tube 16 opposite the sheath member 13 has a portion of reduced internal diameter 47 to snugly receive a coaxial lead 18 comprising a metallic tubular outer conductor 19 and an insulated coaxial inner conductor 20. The sleeve 16 may be formed with a counterbore 48 for receiving a quantity 49 of silver solder or brazing material sealingly affixing the lead 18 to the sleeve 16. The lead 18 with the sleeve 16 and sheath member 13 preferably provide an hermetically sealed enclosure or envelope, said lead preferably taking the form shown in U.S. Patent No. 2,892,879 which matured from the parent of the instant application.

The thermocouple element means 11 is of frangible material and may take the form of a rod-like cylindrical ingot of semi-metallic alloy or composition. The thermocouple element 11 may be formed, for example, of an alloy further described in the copending application of Sebastian Karrer, Serial No. 475,540, filed December 15, 1954, now Patent No. 2,811,570, comprising lead and at least one member of the group tellurium-selenium and sulphur. The outer end of the element 11 is mechanically and electrically joined to the sheath member 13 by means of a contact electrode 22 to which it is bonded, said electrode being formed with a pin portion 46 which extends into the bore 35 and is fixed therein as by silver soldering or brazing. The opposite end of the element 11 is bonded to a contact electrode 23 having a stem portion 24 and a coaxial annular shoulder 40.

Surrounding the stem portion 24 of electrode 23 is an insulating washer or spacer 38 which engages an annular shoulder 37 within the sleeve 16. Interposed between the washer 38 and shoulder 40 is a compression spring 39 which may take the form of a concavo-convex centrally apertured resilient disk also surrounding the electrode stem 24. The element 11 is thus provided with a mechanically stable insulating support and is continuously maintained thereby in coaxial spaced relationship within the sheath member 13, and the spring 39 exerts compressive stress on the element 11 which substantially reduces the net tensile stress to which said element is subjected, and hence the resultant deformation produced therein, during transverse acceleration or shock. This compressive stress is not so high as to exceed the compressive strength of the element 11, however. A tube 45 of insulating material preferably surrounds the contact electrode stem 24 and a flexible conductor 25 which provides an electrical connection between said stem and the inner conductor 20 of the coaxial lead 18.

The contact electrodes 22 and 23 afford electrical and mechanical contact with the thermocouple element 11 over a substantial area of the latter. Such contact electrodes provide contacts of low thermal and electrical resistance and are chemically stable with respect to the element 11. As more fully described in the copending application of Russell E. Frederick et al., Serial No. 475,539, filed December 15, 1954, now Patent No. 2,811,569, iron is especially adapted for use as contact electrode material with lead-tellurium-selenium compositions in that it does not alloy or dissolve in such elements at temperatures below 700° C. which is well above the ordinary upper limit of operating temperatures for elements of lead-tellurium-selenium compositions. In the bonded type of electrode shown in FIGURE 1 the electrode interface should have a mechanical strength at least comparable to that of the alloy of which the element 11 is made.

In the form of the invention shown in FIGURE 1, resistance to fracture of the frangible element 11 is afforded substantially entirely by the action of the spring 39 subjecting said element to compressive stress.

In the form of the invention illustrated in FIGURE 2, the construction is substantially identical with that of the form shown in FIGURE 1 except that the connection between the element 11a and the stainless steel sheath 13a is not made through the medium of a bonded electrode. As shown in FIGURE 2, the sheath member 13a is formed with a conical tapered inner end wall 50 and the semi-metallic element 11a is formed with a complementary conical tapered end wall 51 which is seated against the end wall 50. In FIGURE 2, the bias of the compression spring 39a not only serves to place the element 11a under axial compressive stress, but it also provides the pressure necessary for a satisfactory pressure contact between the element 11a and the sheath 13a at the surfaces 50 and 51.

The pressure type contact is not deleteriously affected by deformation of the element 11a, for example bending under transverse shock producing tensile stresses tending to rupture a bonded type contact. The conical nature of the surfaces 50 and 51 tends to maintain the biased element 11a in centered relationship within the sheath 13a, and it will be observed that this type of pressure contact inherently permits lateral displacement of the element 11a under transverse shock, said element being returned to centered relationship by the coaction of the aforementioned conical surfaces and the bias of the spring 39a following any such displacement. As in FIGURE 1, the compression spring exerts sufficient compressive stress on the frangible element to substantially reduce the net tensile stresses which can arise within said element, without exceeding the compressive strength thereof. The compressive stress thus reduces the degree of deformation produced in the frangible element by a given transverse shock, and, together with the lateral displacement permitted by the pressure contact, affords the thermocouple 10a substantial shock resistance.

In the form of the invention shown in FIGURE 3 the construction is similar to but specifically different from those of FIGURES 1 and 2. In FIGURE 3 the tip portion 15b of the sheath member 13b is tubular, and the stem 46b of the contact electrode 22b extends coaxially therewithin and is electrically joined thereto as by welding at 52 which also effects closure of the end of the tip 15b. The contact electrode 22b and the semi-metallic cylindrical element 11b are formed with complementary conical end surfaces 51b and 50b, respectively in pressure contact. A thin sleeve 55 of electrical insulating material, for example mica, surrounds the portion of the element 11b adjacent the contact electrode 22b in spaced relation within the sheath member 13b as shown. The contact electrode 23b is bonded to the other end of the element 11b, and a pair of insulating washers 53 and 54 have a snug fit on the stem 24b of said electrode, and have an outside diameter sized to afford a snug sliding fit within the bore of the extension sleeve or sheath member 16b.

A tubular fitting or sheath member 17b is telescopically fixed within the opposite end of the bore of the extension sleeve 16b as by silver soldering or brazing, and has a portion of reduced internal diameter 47b to snugly receive the coaxial lead 18b which is sealed thereto, as by silver solder at 49b, disposed coaxially within the sleeve 16b in compressed relation between the fitting 17b and the washer 54 is a helical spring 39b. The helical spring 39b, acting through the washers 54 and 53 and contact electrode 23b, not only serves to place the element 11b under axial compressive stress, but it also provides the pressure necessary for a satisfactory pressure contact between the element 11b and contact electrode 22b.

As in the form of the invention shown in FIGURE 2, the pressure contact permits lateral displacement of the element 11b therewith. Upon exposure to transverse shock, the coaction of the spring force and the conical end surfaces of element 11b and contact electrode 22b tend to return the element 11b to centered relationship in the event of such displacement. The spring 39b, by virtue of its length, has the quality of maintaining a good pressure contact at the surfaces 50b and 51b even though the element 11b may become somewhat shortened in length as a result of sublimation in the area thereof adjacent the contact electrode 22b. In the event of any such sublimation, the insulating sleeve 55 prevents short circuiting between the element 11b and sheath 13b by material of said element deposited in the annular space between said element and sheath.

The bias of the spring 39b, like the bias of the springs of FIGURES 1 and 2, exerts sufficient compressive stress on the frangible element 11b to substantially reduce the net tensile stress which can arise within said element when subjected to transverse shock. This reduces the degree of deformation produced in said element by a given transverse shock and, together with the lateral displacement permitted by the pressure contact, affords the thermocouple 10b substantially improved shock resistance.

FIGURES 4 and 5 illustrate another form of the invention affording substantial shock resistance to a frangible element by placing the latter under axial compression and permitting limited lateral displacement of the element upon exposure to transverse shock. In FIGURE 4, the contact electrodes 23c and 22c are bonded to the opposite ends of the rod-like semi-metallic thermocouple element 11c. Forming a thermoelectric couple with the element 11c is thermocouple element means 12c constructed in a manner to provide resilient mounting means for the element 11, engaging the latter substantially throughout its length and resiliently maintaining said element in coaxial spaced relationship within the sheath member 13c. As shown most clearly in FIGURE 5, the thermocouple element means 12c comprises at least three relatively thin flat strips or bands of deformable, preferably resilient metal, equiangularly spaced around and extending longitudinally of the thermocouple element 11c. The side edges of the metal bands 12c engage the inner surface of the sheath 13c and the outer cylindrical surface of the element 11c is engaged by a central longitudinal portion of the inner surface of the metal bands 12c. The metal bands or spring strips 12c are physically and electrically affixed to the contact electrode 22c at one end, and the opposite ends of said springs are reversely bent and are interposed between the extension sleeve or sheath member 16c and the sheath member 13c as shown, said last-mentioned sheath member, bands and tube all being sealingly and electrically joined as by silver soldering or brazing as shown.

In order to permit the metal bands 12c to function as a second thermocouple element means while in physical contact with the thermocouple element 11c, the inner surface of each of said metal bands is provided with an electrical insulating film or layer 21c electrically insulating the inner surface of each of said bands from the element 11. Silicone, resins and varnishes have been found to work out satisfactorily as the insulating films 21c which, because of the low voltages developed, may be very thin. Because of the thin character of the films 21c, the bands 12c are formed of metal having a thermal expansion coefficient matching that of the thermocouple element 11c, thereby avoiding relative displacement of the bands on said element tending to rub the insulating film 21c off of said bands. Austenitic stainless steel and beryllium copper alloys are suitable for the springs 12c when the element 11c is formed of an alloy of lead and tellurium of the type which generates a negative E.M.F., since austenitic stainless steel and beryllium copper alloys each generate a positive E.M.F.

As in the form of the invention shown in FIGURES 1 and 2, a concavo-convex spring washer is interposed between the shoulder 40c on the contact electrode 23c and an insulating washer 38c, the latter abutting annular shoulder 37c within the extension sleeve 16c. The spring 39c exerts a compressive stress on the element 11c through the contact electrode 23c, and the metal bands 12c serve the dual function of cushioning the element 11c and of acting as a second thermocouple element means, said bands being connected in circuit with the outer conductor of the coaxial lead 18c through the extension tube 16c and cap 17c. The sheath 13c, in view of the abutting contact of the inturned ends of the bands 12c with the end wall of said sheath there adjacent, may function as a thermoelectric element as in the other forms of the invention, said element being in parallel circuit relation with the bands 12c.

The mounting thus afforded to the frangible element 11c permits limited lateral displacement of the forward end of said element upon exposure of the device to transverse shock, and said element is cushioned by the springs 12c during any such movement, said springs preventing impactual engagement of the element on sheath 13c. The compressive stress exerted on the element 11c by the spring 39c reduces the magnitude of the tensile stresses and hence the deformation which can occur in the element 11c during subjection of the couple 10c to transverse shock, and together with the lateral displacement permitted by the springs 12c, affords the couple 10c substantial shock resistance.

While the electrically conductive elements of frangible material for which improved shock resistant mounting means is provided may take the form of semi-metallic thermocouple elements, it is to be understood that the specific illustrations given are for the purpose of disclosure only and are not intended to impose unnecessary limitations on the claims or to confine the invention to a particular use.

What is claimed as the invention is:

1. A thermoelectric device comprising a rod-like frangible thermoelectric element having opposite end surfaces, a contact electrode bonded to one end surface of said element, means including a metallic tubular sheath surrounding said element and said electrode and electrically joined to the other end surface of said element to form a thermojunction therewith, at least one insulating spacer engaging said contact electrode and the portion of said sheath adjacent said electrode to provide a mechanically stable insulating support continuously maintaining said electrode and the adjacent end of said element in coaxial spaced relation within said sheath portion, and means including a spring within said sheath having a force transmitting connection with a portion of said sheath and with said bonded contact electrode continuously biasing said electrode toward said element to thereby place said element under continuous longitudinal compression affording the latter substantial shock resistance.

2. A thermoelectric device according to claim 1 wherein there is mounting means tending to retain the portion of the thermoelement adjacent said thermojunction in coaxial spaced relation within said sheath and permitting lateral displacement of said element portion upon exposure of said device to transverse shock.

3. A thermoelectric device according to claim 1 wherein said thermoelement and means including said sheath are provided at said thermojunction with complementary tapered surfaces tending to retain the portion of said biased element adjacent said thermojunction in coaxial spaced relation within said sheath and permitting lateral displacement of said element portion upon exposure of said device to transverse shock.

4. A thermoelectric device according to claim 1 wherein said means including said sheath includes resilient cushioning means interposed between sidewall portions of said element and said sheath tending to retain the portion of said element adjacent said thermojunction in coaxial spaced relation within said sheath and permitting lateral displacement of said element portion upon exposure of said device to transverse shock.

5. A thermoelectric device according to claim 1 wherein said means including a spring comprises at least one spring washer.

6. A thermoelectric device according to claim 1 wherein said means including a spring comprises a helical spring having a length substantially greater than its diameter.

7. A thermoelectric device according to claim 1 wherein there is an insulating sleeve within said sheath surrounding the portion of said thermoelement adjacent said thermojunction.

8. A thermoelectric device according to claim 1 in which the means including a metallic sheath affords an hermetically sealed enclosure for said thermoelectric element.

9. A thermoelectric device according to claim 1 in which the tubular sheath is joined to the thermoelement by a second contact electrode, there being an insulating sleeve within the tubular sheath and surrounding the adjacent portions of said second contact electrode and said thermoelement.

10. A thermoelectric device according to claim 1 wherein said thermoelement and means including said sheath are provided at said thermojunction with complementary tapered surfaces tending to retain the portion of said biased element adjacent said thermojunction in coaxial spaced relation within said sheath and permitting lateral displacement of said element portion upon exposure of said device to transverse shock, there being an insulating sleeve within said tubular sheath and surrounding the portion of the thermoelectric element adjacent the thermojunction.

References Cited in the file of this patent

UNITED STATES PATENTS

| | | |
|---|---|---|
| 2,858,350 | Fritts et al. | Oct. 28, 1958 |
| 2,892,879 | Fritts et al. | June 30, 1959 |

FOREIGN PATENTS

| | | |
|---|---|---|
| 633,828 | Germany | June 12, 1934 |